Patented June 30, 1936

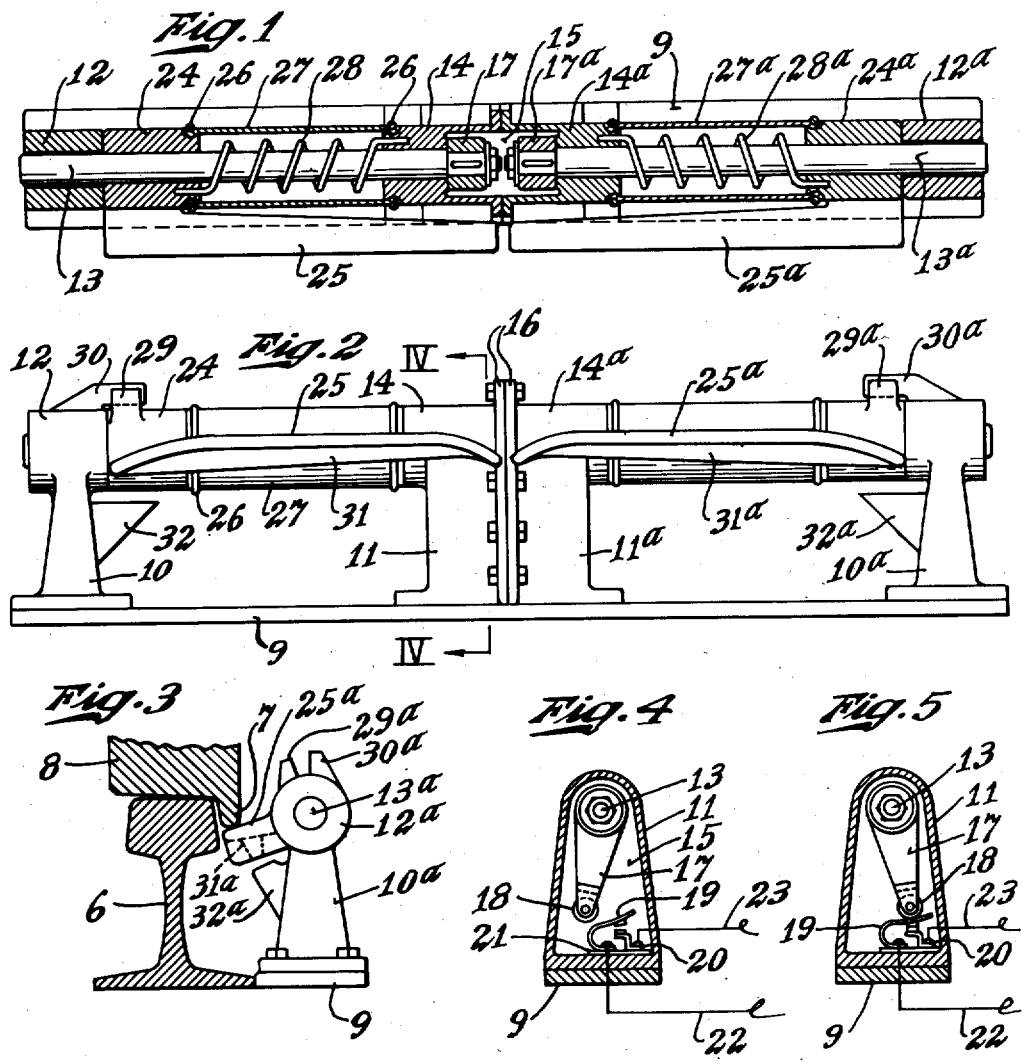
June 30, 1936.  L. M. GIBBS  2,046,157
TRACK INSTRUMENT
Filed June 12, 1930  2 Sheets-Sheet 1
INVENTOR
Leon M. Gibbs

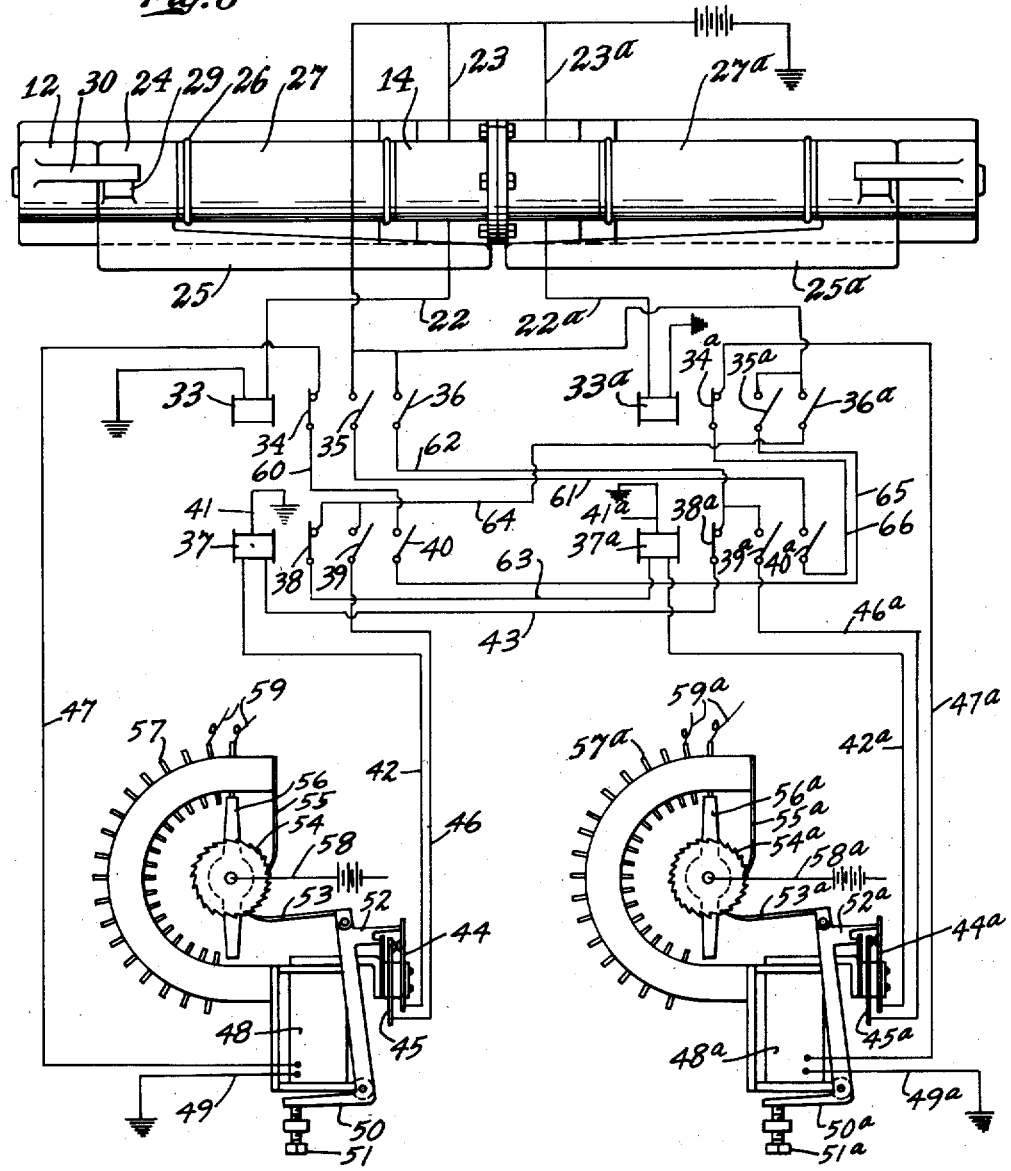

2,046,157

UNITED STATES PATENT OFFICE 2,046,157

TRACK INSTRUMENT

Leon M. Gibbs, Birmingham, Ala., assignor to Teleswitch Corporation, a corporation of Alabama Application June 12, 1930, Serial No. 460,757

8 Claims. (Cl. 246—250)

My invention relates to what are generally known as "track instruments" by which is meant an instrument that is employed in or about railway tracks and which is adapted to respond to the passing of railway rolling stock so as to register same or to actuate other recording or indicating mechanism. Generally speaking, track instruments respond to the passing of some device on a railway car or vehicle, such as a wheel and may be directly operated, or indirectly controlled, thereby.

Where the instrument is designed to count or register accurately the passing of cars or car wheels, especially in and about switching yards and terminals where a car is liable to come to rest on or opposite to the track instrument and to be shifted back and forth past it, it becomes desirable to adapt the instrument to complete a counting or registering cycle when its active car responsive element has been actuated or released by the movement of the car device or wheel past it and to adapt the instrument as a whole to respond selectively to the direction of motion of a passing car device or wheel so that an accurate record may be set up or an account kept of all passing back and forth past it of cars and vehicles or their devices for controlling or actuating the track instrument.

The foregoing purposes are of especial importance when the track instrument is utilized in connection with such a method and apparatus for directing the switching of railway cars as forms the subject matter of Letters Patent of the United States, No. 1,753,602, or as a wheel counter for determining service or trackage charges and the like.

One object of my invention is to perfect a track instrument which may employ any means that will respond to the passing of a control element on a railway vehicle, but which will complete a registering or recording cycle only when two agencies, disposed so as to successively and simultaneously respond to a passing control element, have been both actuated or energized and then the first agency to be actuated shall have been released in advance of the release of the other agency.

Where the track instrument takes the form of an electric circuit controlling switch adapted to be actuated by a passing wheel it presents many problems in design and operation, due to the fact that it must be capable of withstanding the hammer blows that will be delivered to it by the passing wheels of rapidly moving trains and it must not possess so great inertia that it cannot right itself after operation by one wheel before being engaged by the next succeeding wheel in the train. Obviously, with the wheels placed as close as on five foot centers and with the train passing at relatively high speeds over the track instrument, very careful designing of the instrument is necessary to withstand the forces and stresses to which it will be subjected, and in addition it must operate under conditions of exposure to the weather and to very rough usage. I have designed such a track instrument which is relatively simple in construction, inexpensive, rugged, and has its spring and electrical contact parts well housed and protected.

More particularly, it is an object of my invention to simplify and perfect a track instrument suitable for the control, by the passing wheels, of circuits including the relays and related switches which will control the operation of dummies representative of railway cars in a switch yard. The switch required for this particular service is a double switch capable of functioning selectively according to the direction of travel of a passing wheel and which is associated with relay controlled circuits which render it effective to signal or register only when both switches have been held closed at the same time and then the one first closed has been released in advance of the other by the passing wheel. It will be understood however that many of the novel features of construction and the distinctive arrangements of parts are applicable to single as well as double switch track instruments.

More particularly, my invention contemplates the provision of an oscillatory switch member journalled so that its axis and its trip lever lie parallel with the track and alongside one rail in position for the lever to be depressed by the flange of each wheel passing over said rail, the contact members of the switch being housed and the coil spring for returning the lever to its operative position being protected by a flexible shield which also preferably serves to prevent access of moisture to the contact housing.

A further distinctive feature of my invention is the mounting of the contact members in a separate chamber with the actuating rocker shaft projecting therefrom and journalled in spaced bearings with the hub of the trip lever mounted fast thereon between the bearings and carrying a flexible sleeve connecting the hub and the bearing more remote therefrom so as to house the shaft and a coil spring surrounding same. Where the double switch track instrument designed is employed, the two contact members are mounted in a common chamber formed by bolting the two contact chambers together.

A further distinctive feature is in the provision for ample over run in the coaction of the contact elements of the switch to care for differences in wheel flanges.

A further distinctive feature lies in pivotally mounting the levers near one end and disposing the coacting pairs of a track instrument with their free ends juxtaposed so as to be held jointly depressed by the same wheel flange.

My invention further comprises the novel details of construction and arrangements of parts, which in their preferred embodiment only are illustrated in the accompanying drawings which form a part of this specification, and in which:—

Fig. 1 is a horizontal cross-sectional view taken through a double switch track instrument showing the trip levers and the rocker shafts and coil springs in plan.

Fig. 2 is a side elevation of the track instrument shown in Fig. 1.

Fig. 3 is an end elevation of Fig. 2, showing the trip lever depressed by a passing wheel flange.

Figs. 4 and 5 are views both taken on the line IV—IV of Fig. 2, and respectively showing the switches in open and closed positions.

Fig. 6 illustrates my improved track instrument associated with relay controlled switch mechanism to regulate and selectively control the conditions under which it will register or record a passing vehicle.

Similar reference numerals refer to similar parts throughout the drawings.

In the embodiment of my invention illustrated, I have shown my improved track instrument alongside a railway track rail 6 and adapted to be actuated by the flange 7 of a passing wheel 8, which is typical of any control element on a vehicle. I provide a suitable base plate 9 connected to the rail supports (not shown), and on this base I mount for each double switch track instrument a pair of spaced brackets 10 and 11, and it will be understood that though I show two instruments connected together and coordinated they are duplicates one of the other and either instrument is capable of independent use.

The following description of one track instrument switch will serve for both. The bracket 10 carries the outer bearing 12 for a rocker shaft 13 which at its inner end is journalled in a bearing 14 on the bracket 11. In this bearing 14 and the bracket 11 I provide a switch chamber 15 extending from the upper portion of the bearing to a point near the bottom of the bracket. This chamber is open on one side and is provided with a suitable removable closure which, in the double switch construction illustrated, is formed by the corresponding bracket and bearing members 11a and 14a of the adjacent track instrument. The chambered bearing brackets and bearings are provided with faced flanges 16 which are bolted together so as to afford a moisture tight closure for the chambers 15.

One end of rocker shaft 13 projects into chamber 15 and there has keyed thereon a crank arm 17 yoked at its lower end to receive a roller 18 rotatably mounted on the arm and adapted to engage and depress the upper movable spring contact member 19 into engagement with the lower rigid contact member 20.

The contact member 19 is of the spring type bent in U-shape with its base connected to a suitable insulation plate 21 secured to the bottom of the chamber 15.

The coacting contact members 19 and 20 are respectively connected to leads 22 and 23 of the circuit that is adapted to be opened and closed responsive to each oscillation of their controlling rocker shaft 13 by a passing wheel.

The rocker shaft 13 has fast thereon adjacent to the bearing 12 a hub 24 that connects to one end of the trip lever 25 which is disposed to be actuated by a wheel flange 7 to rock shaft 13 in its bearings 12 and 14.

The bearing 14 has its end toward the bearing 12 overhung and cylindrical in shape with its diameter corresponding to the diameter of the cylindrical hub 24. The adjacent ends of the elements 14 and 24 are circumferentially grooved to receive the bands 26 which serve to secure the ends of a tubular flexible hose or guard 27 in position to surround and house a coil spring 28 that is made fast at one end to the hub 24 and at the other end to the bearing 14 and serves to return the lever 25 when depressed to raised position with its stop shoulder 29 abutting a stop lug 30 on the bearing 12. The hub 24 is shrunk or otherwise fitted so tightly on the rocker shaft 13 that water cannot leak through it into the spring chamber.

The ends of the lever 25 are downwardly inclined and it is made of light durable metal braced by a longitudinal rib or web 31. The downward motion of a lever responsive to engagement with the wheel flange is limited by a stop 32 on the bracket 10 disposed so as to allow the lever to swing freely downward through the maximum angle necessary to more than clear the deepest flange 7 of a wheel and yet to stop the rocker shaft before its arm 17 engages the side wall of switch chamber 15.

In Fig. 6 I have shown the track instrument in plan with right and left hand levers, respectively, distinguished by the reference numerals 25 and 25a, and wherever in the following description it is necessary to distinguish between like parts of the two duplicate switch mechanisms controlled by the same track instrument, the part on the right will be distinguished from the corresponding part on the left by the suffix "a".

The track instrument here shown is connected up with the wheel controlled relay switches and step-by-step switches illustrated and claimed in Letters Patent 1,924,491 issued on August 29th, 1933, in association with mechanism for controlling the feed of wheel counters over a dummy switch yard corresponding in track and switch equipment with a railway switch yard. It will be understood, however, that the rotary step-by-step switches or equivalent electrical impulse distributing devices may be used to control work circuits for any other purpose, such as signalling train movements or recording or otherwise indicating, selectively as to direction, the passing of wheels or cars.

In the embodiment shown, the leads 23 and 23a are connected to a suitable source of energy. The lead 22 is connected to the magnet 33, and the lead 22a is connected to the corresponding magnet 33a.

The magnet 33 controls three spring switches, 34, 35 and 36, and when the magnet is deenergized, switch 34 will close and switches 35 and 36 will open. A second relay magnet 37 controls three spring switches 38, 39 and 40, and when this magnet is deenergized, 38 closes and 39 and 40 open. The magnet 37 is connected to the wires 42 and 43 so that either, when the circuit thereover is closed to the ground 41, will energize this magnet. The wire 42 leads to a spring switch arm 44 which engages the switch arm 45, in turn connected by the lead 46 with the switch 39. Magnets 33, 33ᵃ, 37, 37ᵃ and the contacts for the switches 35, 36, 35ᵃ, 36ᵃ are all connected to a ground or battery as indicated formally by a wire symbol.

The lead 47 connects switch 34 with a magnet 48 which is grounded by the lead 49 and this magnet has a bell crank armature 50 engaging an adjustable stop 51 on one side and on the other side having an arm 52 disposed to engage and actuate the spring contact 44. The armature carries a spring pawl 53 which engages a ratchet wheel 54 held against reverse rotation by the spring dog 55. The ratchet carries a double contact arm 56 rotatable over a semicircular series of insulated contacts 57 from which lead electrical work or impulse distributing circuits 59 which are adapted to be established through the wire 58, contact arm 56, and the contact segments 57 successively to deliver current into the desired work circuit 59, only two of which work circuits are shown, but one of which is provided for each contact 57.

The switch 34 is connected by a wire 60 to the switch 40. The switch 35 is connected by a wire 61 to the switch 40ᵃ controlled by a magnet 37ᵃ. The switch 36 is connected by a wire 62 with a branch circuit leading to the switches 38ᵃ and 39ᵃ, also controlled by the magnet 37ᵃ. The switch 38 is connected on one side to the magnet 37ᵃ by the wire 63, and on the other side this switch and switch 39 are connected by a wire 64 to the switch 36ᵃ controlled by the magnet 33ᵃ.

The switch 35ᵃ is connected by a wire 65 with the switch 40, and the switch 34ᵃ is connected by a wire 66 with a switch 40ᵃ. The magnet 37ᵃ is connected by a wire 42ᵃ with the switch 44ᵃ, and the switch 39ᵃ is connected by the wire 46ᵃ with the switch 45ᵃ. The magnet 48ᵃ, through parts corresponding to those already described, will actuate the rotary switch arm 56ᵃ step-by-step over the contacts 57ᵃ to close the circuit from 58ᵃ to the selected work circuit 59ᵃ.

With the parts connected up as described, the operation of the track instrument will be as follows, assuming the controlling wheel to be traveling past it to the right. Its arm 25 will first be actuated, closing its respective switch 19, so current will flow over wire 22 to energize magnet 33, opening the switch 34 and closing the switches 35 and 36. The switch 36 will pass current to the switch 38ᵃ which normally stands closed and thence to the magnet 37 which is thereby energized. Switch 35 will pass current over wire 61 to the open switch 40ᵃ.

When the wheel moves onto and actuates lever 25ᵃ, it will close its respective switch 19 and pass current over wire 22ᵃ to magnet 33ᵃ which will open switch 34ᵃ and close switches 35ᵃ and 36ᵃ and current will flow from 36ᵃ to the then open switch 38 and to the then closed switch 39 and on through the normally closed switch 44 and wire 42 to magnet 37 which is at the time being held energized by the circuit closed through switch 36, wire 62, switch 38ᵃ and wire 43.

When lever 25 is released and its respective switch opens responsive to the car wheel having passed off from it and onto lever 25ᵃ, the magnet 37 will be held energized through the circuit over 36ᵃ, 64, 39, 46, 45, 44, and 42 until switch 44 is opened by the action of the armature 50; the magnet 33 will be deenergized and the switch 34 will spring closed, closing the circuit from switch 35ᵃ by a wire 65, switch 40, wire 60, switch 34 to energize magnet 48 and actuate its armature 50 to open the switch 44, which will deenergize magnet 37, open switch 40, and will thereby deenergize magnet 48, permitting the spring actuation of its pawl 53 to advance the contact arm 57 one step after which switch 44 resumes closed position.

Had the car wheel stopped before releasing lever 25, or had it backed off said lever, then magnet 48 would never have been energized as switch 35ᵃ would have remained open. Therefore, only when a control wheel moving to the right passes from lever 25 onto lever 25ᵃ and releases lever 25, does it cause the contact arm 56 to advance one step and after it has advanced the arm 56, if the wheel stops and moves back to again depress lever 25, the action will be the same as if the wheel had originally approached the track instrument from the right hand side.

When a wheel approaches from the right, it first depresses the lever 25ᵃ, energizes magnet 33ᵃ, closes switch 36ᵃ, passes current through switch 38 to energize magnet 37ᵃ. When lever 25 is actuated and its switch closed, the magnet 33 will be energized, closing switch 36 and passing current through switches 39ᵃ, wire 46ᵃ contacts 45ᵃ, 44ᵃ, wire 42ᵃ, to magnet 37ᵃ; and as soon as lever 25ᵃ is released, magnet 33ᵃ is deenergized but magnet 37ᵃ is held energized through circuit 62, 39ᵃ, 46ᵃ, 42ᵃ and current flows through the connections for the closed switches 35, 40ᵃ and 34ᵃ to magnet 48ᵃ which actuates its respective armature 50ᵃ, opens switch 44ᵃ, thereby deenergizing magnet 37ᵃ and opening switch 40ᵃ, which deenergizes magnet 48ᵃ and permits its spring actuated armature, by engagement with the ratchet wheel 54ᵃ, to advance contact arm 56ᵃ one step.

Thus, as control wheels pass back and forth over the track instrument, they will act both successively and simultaneously to close the switches operated by levers 25, 25ᵃ, and, responsive to the joint action and selectively responsive to the order in which said levers are actuated and released, the mechanism will record the passing of the wheel and will selectively as to direction of car movement advance the appropriate rotary switch 56 or 56ᵃ. Thus, for each vehicle or control wheel passing to the right, switch 56 will be advanced one step, and for each vehicle or control wheel passing to the left, switch 56ᵃ will be advanced one step, and as these arms are advanced, they will successively close the work circuits 59, 59ᵃ which they respectively control, and these work circuits may bring into action any suitable mechanism which it is desired to have respond to, or to in any manner register or record, the fact of the movement of a control wheel or vehicle past the track instrument.

While the leads 59 and 59ᵃ are representative of circuits or means for doing the ultimate work contemplated, I regard the mechanism shown as consisting essentially in a pair of primary controllers, such as the track instruments, secondary agencies selectively actuated or controlled by the joint action of said primary controllers, and right and left work elements such as the electrical impulse distributors 56, 57, 59 and 56ᵃ, 57ᵃ, 59ᵃ which may reflect themselves, or translate into any suitable mechanism, not shown, the fact and direction of an object's passage over or by the primary controllers, responsive to the resulting activity of the selective agencies.

In my patent aforesaid, the mechanism illustrated in Fig. 6 is described and claimed in its association with a mechanism for automatically directing the switching of railway cars. In this case the mechanism is claimed separately as a switch mechanism independently of any particular duty to be assigned to it.

The levers 25, 25ᵃ can be made of light strong metal and it will be observed that they are elongated and the ends are sloped down to reduce the jolt or impact from a passing wheel. Their rocker shafts need have but negligible inertia, so that the spring pressed levers can respond easily and quickly to each rapidly passing wheel. Though I have shown mechanically actuated switches as suitable means to control the selective energization of the switch mechanism controlling the work circuits, other agencies may be substituted where better suited to the working conditions. While I am of the opinion that fast relays are best adapted to carry out the selective operation of the step-by-step switch or control mechanisms, I do not wish to limit myself thereto, but to use any transmission means suitable and available.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. Mechanism for checking the fact and direction of movement of an object past a point along its path, comprising a plurality of instrumentalities positioned to be successively and simultaneously influenced by the passage of the object, a pair of work circuits selectively responsive to said instrumentalities according to the direction of movement of the object, and means to prevent the response of either one of said work circuits until the object has reached a position where upon reversal it will effect a response of the other work circuit.

2. Mechanism for registering the fact and direction of movement of an object past a point along its path, comprising a plurality of instrumentalities positioned to be successively and simultaneously influenced by the passage of the object, a pair of mechanisms selectively responsive to said instrumentalities according to the direction of movement of the object, means for preventing the actuation of either one of said mechanisms until the passing object has reached such a position relative to said instrumentalities that upon its reversal it will actuate the other of said mechanisms.

3. In combination, a right hand checker, a left hand checker, a selective transmission for operating one or the other of said checkers, a pair of controllers for said transmission, and means controlled by the action of a passing object on said controllers to select and energize the appropriate checker only when the passing object has ceased to influence the first controller while still influencing the second.

4. In combination, a right hand checker, a left hand checker, a selective transmission for operating one or the other of said checkers, a pair of controllers for said transmission, means controlled by the action of a passing object on said controllers to select and energize the appropriate checker only when the passing object has ceased to influence the first controller while still influencing the second, and impulse distributing means controlled by said checkers.

5. Apparatus which responds to the movement of an object past a point along its path of movement, comprising a responsive mechanism, an actuating means therefor comprising a plurality of instrumentalities operatively connected to the mechanism and adapted to be jointly influenced and successively released by the passing of said object to effect an actuation of the mechanism, and means for intercepting the actuation of the mechanism until the passing object has released the first instrumentality jointly influenced by it prior to the release of the second.

6. Apparatus responsive to the fact and direction of movement of an object past a point along its path of movement, comprising means operable for each direction of movement, and selective operating mechanisms therefor comprising a plurality of instrumentalities adapted to be successively influenced and the first so influenced to be released by the passing of said object prior to the release of the second before effecting a selective actuation of the appropriate directional means, and means for intercepting the actuation of one directional means until both of said instrumentalities have been influenced by the passing object and have assumed position to influence the other directional means upon reversal of movement of the object.

7. The herein described method of checking directionally the passing of railway vehicles, which consists in requiring a passing vehicle both to successively and simultaneously actuate coordinated control mechanisms and restraining the checking cycle becoming completed until the first mechanism to be actuated has been fully released by the passing vehicle prior to the release of the other mechanism.

8. Mechanism for registering the fact and direction of movement of an object past a point along its path, comprising a separate checker for each direction of movement to be registered, two instrumentalities positioned to be successively and simultaneously influenced by the passing of the object and relay controlled electric circuits including switch means operable by said instrumentalities and electro-magnetic means to operate said checkers, the relay and switch means being adapted to energize neither of the electromagnetic means until both instrumentalities have been influenced by the passing object and the first to be influenced has been released from such influence prior to the release of the other.

LEON M. GIBBS.